(12) United States Patent
Ihle et al.

(10) Patent No.: US 10,024,725 B2
(45) Date of Patent: Jul. 17, 2018

(54) TEMPERATURE SENSOR SYSTEM AND METHOD FOR PRODUCING A TEMPERATURE SENSOR SYSTEM

(71) Applicant: EPCOS AG, Munich (DE)

(72) Inventors: Jan Ihle, Grambach (AT); Oliver Bard, Falkensee (DE); Gerald Kloiber, Feldkirchen (AT)

(73) Assignee: EPCOS AG, Munich (DE)

( * ) Notice: Subject to any disclaimer, the term of this patent is extended or adjusted under 35 U.S.C. 154(b) by 482 days.

(21) Appl. No.: 14/442,357

(22) PCT Filed: Sep. 27, 2013

(86) PCT No.: PCT/EP2013/070250
§ 371 (c)(1),
(2) Date: May 12, 2015

(87) PCT Pub. No.: WO2014/072124
PCT Pub. Date: May 15, 2014

(65) Prior Publication Data
US 2016/0290872 A1    Oct. 6, 2016

(30) Foreign Application Priority Data

Nov. 12, 2012 (DE) .......................... 10 2012 110 822

(51) Int. Cl.
*G01K 1/08* (2006.01)
*G01K 7/22* (2006.01)

(52) U.S. Cl.
CPC *G01K 1/08* (2013.01); *G01K 7/22* (2013.01)

(58) Field of Classification Search
CPC . G01K 1/08; G01K 7/22; G01K 7/233; B28B 1/24; C04B 35/10; C04B 35/64
See application file for complete search history.

(56) References Cited

U.S. PATENT DOCUMENTS 5,142,266 A * 8/1992 Friese ................... G01K 7/223
338/22 R
5,697,706 A * 12/1997 Ciaravino ............... G01K 3/14
374/166

(Continued)

FOREIGN PATENT DOCUMENTS

| CN | 102216747 A | 10/2011 |
| CN | 102419219 A | 4/2012 |

(Continued)

*Primary Examiner* — Lisa Caputo
*Assistant Examiner* — Philip Cotey
(74) *Attorney, Agent, or Firm* — Slater Matsil, LLP

(57) ABSTRACT

The invention relates to a temperature sensor system comprising a first ceramic housing part comprising a sleeve-shaped lower part with a first lower end having a first opening, and a second upper end having a second opening, and an upper part connected to the second upper end. The temperature sensor system further comprises a temperature probe element which is at least partially arranged in the lower part and which has a ceramic sensor element housing, a sensor element arranged in the sensor element housing, and electrical supply lines. The sensor element housing is at least partially arranged in the first opening. The ceramic sensor element housing has a higher thermal conductivity than the first ceramic housing part. Also disclosed is a method for producing a temperature sensor system.

20 Claims, 6 Drawing Sheets

(56) References Cited

U.S. PATENT DOCUMENTS

| | | | |
|---|---|---|---|
| 9,318,684 B2* | 4/2016 | Koto | H01L 37/00 |
| 2002/0075129 A1* | 6/2002 | Mizoguchi | G01K 1/16 |
| | | | 338/25 |
| 2002/0090019 A1* | 7/2002 | Marto | G01K 1/08 |
| | | | 374/185 |
| 2006/0139144 A1* | 6/2006 | LaBarge | G01K 7/16 |
| | | | 338/308 |
| 2007/0110124 A1 | 5/2007 | Shiraki et al. | |
| 2007/0171959 A1* | 7/2007 | Irrgang | G01K 1/10 |
| | | | 374/185 |
| 2007/0195857 A1* | 8/2007 | Krishnamurthy | G01K 1/16 |
| | | | 374/148 |
| 2007/0297486 A1* | 12/2007 | Landis | G01K 1/10 |
| | | | 374/185 |
| 2008/0205484 A1* | 8/2008 | Toudou | G01K 1/08 |
| | | | 374/185 |
| 2009/0148657 A1* | 6/2009 | Ihle | B28B 1/24 |
| | | | 428/131 |
| 2009/0268779 A1* | 10/2009 | Hotta | G01K 1/10 |
| | | | 374/179 |
| 2010/0123543 A1 | 5/2010 | Kloiber et al. | |
| 2010/0327849 A1* | 12/2010 | Kamen | A61M 1/1605 |
| | | | 324/105 |
| 2011/0013669 A1* | 1/2011 | Raj | G01K 1/08 |
| | | | 374/179 |
| 2012/0044972 A1 | 2/2012 | Ito et al. | |
| 2013/0223479 A1* | 8/2013 | Satou | G01K 1/12 |
| | | | 374/163 |

FOREIGN PATENT DOCUMENTS

| | | |
|---|---|---|
| DE | 102004007906 A1 | 9/2005 |
| DE | 102004018354 A1 | 11/2005 |
| DE | 102008002191 A1 | 12/2009 |
| EP | 1785705 A1 | 5/2007 |
| EP | 2420807 A2 | 2/2012 |
| JP | H0854291 A | 2/1996 |
| JP | H1123379 A | 1/1999 |
| JP | 2000035364 A | 2/2000 |
| JP | 2000213994 A | 8/2000 |
| JP | 2002131141 A | 5/2002 |
| JP | 2005024344 A | 1/2005 |
| JP | 2010032227 A | 2/2010 |

* cited by examiner

TEMPERATURE SENSOR SYSTEM AND METHOD FOR PRODUCING A TEMPERATURE SENSOR SYSTEM

This patent application is a national phase filing under section 371 of PCT/EP2013/070250, filed Sep. 27, 2013, which claims the priority of German patent application 10 2012 110 822.6, filed Nov. 12, 2012, each of which is incorporated herein by reference in its entirety.

TECHNICAL FIELD

The present invention relates to a temperature sensor system including a temperature probe and a method for producing the same.

BACKGROUND

For monitoring and control in a wide range of applications, temperatures are measured for example using ceramic NTC thermistors (negative temperature coefficient thermistors), silicon temperature sensors (for example what are known as "KTY temperature sensors"), platinum temperature sensors ("PRTDs" or "platinum resistance temperature detectors") or thermocouples ("TCs").

For easy mounting in an application, for sufficient mechanical stability, and for protection of the actual temperature sensor element against external influences as well as for avoidance of corrosion by aggressive media, the installation is provided in housings that usually consist of plastics, of simple metal structures or of plastic/metal composites. For electrical connection, plug contacts and/or line feeds are usually integrated into the housings. Suitable sealing of such systems is provided with use of seals, potting materials and/or adhesives.

Sensor systems with plastic or polymer housings, however, cannot be used for the measurement of very high temperatures. The maximum working temperatures of such systems with plastic or polymer housings are limited to approximately 200° C. to 250° C. Metals, by contrast, which are essentially more thermally stable, have the disadvantage that complex housing shapes are difficult to produce and therefore the geometric requirements for the application usually cannot be met. Furthermore, sensor systems with metal housings can be used only to a limited extent in particularly aggressive media due to the appearance of corrosion. A further considerable disadvantage of the systems constructed in this way is the delayed response time thereof due to additional design-induced heat transfers and low thermal conductivity of the used materials.

A sensor system having a metal housing is known from document EP 2 420 807 A2.

Document JP 2010 032 237 A describes a sensor system having a ceramic sleeve.

SUMMARY

Embodiments of the present invention include temperature sensor systems that are highly robust and also have a short response time. Temperature sensor systems and methods for producing temperature sensor systems according to exemplary embodiments of the invention are described herein.

A temperature sensor system according to at least one embodiment comprises a first ceramic housing part. The first ceramic housing part has a sleeve-shaped lower part with a first lower end having a first opening, and a second upper end having a second opening, and an upper part connected to the second upper end.

The temperature sensor system also comprises a temperature probe element arranged at least in part in the lower part of the first ceramic housing part. The temperature probe element comprises a ceramic sensor element housing, a sensor element arranged in the sensor element housing, and also electrical feed lines. The sensor element housing is arranged at least in part in the second opening. In particular, the sensor element housing can be arranged in part in the sleeve-shaped lower part and can protrude in part from the sleeve-shaped lower part. The ceramic sensor element housing and the first ceramic housing part preferably have a different thermal conductivity. In accordance with a particularly preferred embodiment the ceramic sensor element housing has a higher thermal conductivity than the first ceramic housing part.

In accordance with a further embodiment the sensor element arranged in the sensor element housing is embodied as a ceramic thermistor element. By way of example, the sensor element may be a negative temperature coefficient ("NTC") thermistor element. NTC thermistor elements are characterized in particular by their low production costs. A further advantage of NTC thermistor elements, for example compared to thermocouples or metal resistor elements, such as Pt elements, lies in a significant negative resistance temperature characteristic. It is also possible for the sensor element to be embodied as a positive temperature coefficient ("PTC") thermistor element.

In accordance with a further embodiment the sensor element is arranged in the ceramic sensor element housing in such a manner that at least one side face of the sensor element is in direct form-fitting contact with the sensor element housing. By way of example, the sensor element may comprise a plurality of side faces, wherein at least one side face is in direct contact over the entire area with an inner wall of the sensor element housing. Here, the form of the inner wall of the sensor element housing is preferably adapted in this region to the side face of the sensor element, thus providing the form-fitting contact between the inner wall of the sensor element and the inner wall of the sensor element housing. There are preferably no further elements, such as potting materials or heat-conductive pastes, arranged between on the one hand the side face of the sensor element in direct and form-fitting contact with the sensor element housing and on the other hand the sensor element housing.

In accordance with a further embodiment the sensor element housing comprises a structural ceramic material with a high thermal conductivity, or consists of such a material. The sensor element housing preferably comprises aluminum oxide. A sensor element housing of this type is advantageously characterized by a particularly high thermal conductivity. The sensor element housing may comprise aluminum oxide of different quality. By way of example, the sensor element housing may comprise aluminum oxide with a purity of at least 95% to 99.9% or more. Here, the robustness of the sensor element housing with regard to the mechanical strength and the chemical resistance as well as the thermal conductivity increase with the purity of the material. In accordance with a particularly preferred embodiment the sensor element housing consists of aluminum oxide. Alternatively, the sensor element housing may comprise or may consist of a different ceramic material, such as aluminum nitride or silicon carbide.

The temperature sensor system advantageously has very short response times that preferably are below three seconds, for example depending on the wall thickness and on the material of the sensor element housing. The response times may preferably be less than a second and are even a few milliseconds, for example when the sensor element housing has very thin wall thicknesses.

In accordance with a further embodiment the sensor element housing is an injection-molded housing. The sensor element housing can be produced in particular by means of ceramic injection molding technology, for example by means of what is known as ceramic micro injection molding technology. Very small housing shapes of the sensor element housing adapted to the dimensions of the sensor element can be produced advantageously by means of ceramic micro injection molding technology in a precise and reproducible manner and with very high mechanical strength, wherein a standardized installation geometry is made possible.

In accordance with a further embodiment the sensor element has a perovskite structure comprising the elements Y, Ca, Cr, Al, O. The sensor element may also comprise the element Sn based on perovskites.

In accordance with a further embodiment the sensor element comprises a ceramic material with a perovskite structure of general chemical formula $ABO_3$. Sensor elements of this type are preferred in particular for temperature sensors stable at high temperature, which are to be suitable for high application temperatures. The sensor element particularly preferably has the composition $(Y_{1-x}Ca_x)(Cr_{1-y}Al_y)O_3$ with x=0.03 to 0.05 and y=0.85.

In accordance with a further embodiment the sensor element has a spinel structure, comprising the elements Ni, Co, Mn, O. The sensor element based on spinels may also comprise one or more of the following elements: Al, Fe, Cu, Zn, Ca, Zr, Ti, Mg.

In accordance with a further embodiment the sensor element comprises a ceramic material with a spinel structure of general chemical formula $AB_2O_4$ or $B(A,B)O_4$. Sensor elements of this type are preferred in particular at low application temperatures. In accordance with a particularly preferred embodiment the sensor element has the composition $Co_{3-(x+y)}Ni_xMn_yO_4$ with x=1.32 and y=1.32.

In accordance with a further embodiment the sensor element housing has wall thicknesses between 0.1 mm and 1 mm. This may mean in particular that the sensor element housing has at least one housing wall that has thicknesses between 0.1 mm and 1 mm. The sensor element housing overall preferably has wall thicknesses in the specified range. In accordance with a particularly preferred embodiment the sensor element housing has wall thicknesses between 0.3 mm and 0.7 mm. As a result of such wall thicknesses of the sensor element housing, a particularly short response time of the temperature probe can be attained.

In accordance with a further embodiment the electrical feed lines are embodied as two contact elements that are electrically conductively connected to the sensor element. The contact elements preferably comprise thermally stable materials with a low corrosion tendency. By way of example, the contact elements may comprise noble metals, such as platinum, gold or silver, or steel alloys stable at high temperatures, preferably with high contents of chromium and/or nickel, or may consist of one of these materials.

In accordance with a further embodiment the contact elements are embodied as connection wires. By way of example, the contact elements can be embodied in the form of copper wires sheathed with nickel or with one or more of the other previously mentioned metals.

In accordance with a further embodiment the sensor element comprises two electrodes. The electrodes are preferably applied to two opposite side faces of the sensor element. The contact elements are preferably electrically conductively connected to the electrodes of the sensor element by means of an annealed metallization paste. The electrodes of the sensor element for example may comprise or consist of metals, for example platinum, gold, silver, or metal alloys, for example silver/palladium, depending on the maximum working temperature of the temperature sensor. The metallization pastes used for electrical contact between the contact elements and the electrodes of the sensor element preferably comprise noble metals, such as gold, silver, or platinum, or consist thereof. Furthermore, the metallization pastes may comprise or consist of copper, molybdenum or tungsten or a metal alloy, for example silver/palladium.

In accordance with a further embodiment the sensor element housing is sealed on the rear side by means of a glass seal. The contact elements preferably protrude from the glass seal and thus reach outwardly from inside the sensor element housing, through the glass seal. The glass seal, for example, comprises glasses free from alkali and/or heavy metal oxide with a coefficient of expansion adapted to the material of the sensor element housing. The material used for the glass seal advantageously comprises a softening point that is at least 50° C. above a maximum working temperature of the temperature sensor.

In accordance with a further embodiment the upper part of the first ceramic housing part has recesses in which the electrical feed lines of the temperature probe element are arranged and guided at least in part. The recesses can be embodied, for example, in the form of inwardly arranged pockets or indentations, which guide and receive the electrical feed lines.

In accordance with a further embodiment the lower part and the upper part of the first ceramic housing part are formed in one piece. By way of example, the lower part and the upper part can be produced in a common manufacturing process. In particular, the lower part and the upper part are not two separately produced components that are interconnected by means of a connection method, for example with the aid of a fastening means. There are advantageously no interfaces provided between the lower part and the upper part of the first ceramic housing part.

In accordance with a further embodiment the first ceramic housing part is an injection-molded part. By way of example, the first ceramic housing part can be produced by means of what is known as ceramic injection molding technology. Very complex ceramic housing designs adapted to customer-specific requirements that have high mechanical strength can be produced advantageously with the aid of ceramic injection molding technology in a precise and reproducible manner.

In accordance with a further embodiment the first ceramic housing part comprises a material with a low thermal conductivity. The first ceramic housing part preferably comprises mullite, steatite or zirconium oxide, or consists of one of the aforementioned materials. An intensified heat dissipation via the first ceramic housing part, which would lead to a delay of the response time of the temperature sensor system, is advantageously avoided by a use of poorly thermally conductive ceramic materials.

In addition, less heat can be dissipated outwardly, and temperatures in the region of the electrical feed lines are reduced. At the same time, the specified materials have very high mechanical strength and provide the sensor system with the necessary mechanical stability in order to satisfy the stipulated loads in the applications. By way of example, a use in particularly extreme cases of use with particularly high mechanical and/or chemical loads is also possible due to a use of stabilized zirconium oxide.

In accordance with a further embodiment the ceramic sensor element housing has a peripheral protrusion. The protrusion is preferably connected to the second opening in a form-fitting manner by means of an adhesive bond.

In accordance with a further embodiment the temperature sensor system comprises a second ceramic housing part which is connected to the upper part of the first ceramic housing part. The second ceramic housing part preferably closes the temperature sensor system. The upper part may comprise an extension for example, which protrudes into the open upper end of the sleeve-shaped lower part and by means of which the upper part can be fixed to the lower part. The extension preferably comprises recesses in which the electrical feed lines of the temperature probe element are arranged and guided at least in part. The first and the second ceramic housing part can thus be provided with integrated line guides preferably matched geometrically to the electrical feed lines. Furthermore, the first and second ceramic housing part sealing faces can be provided, which for example can be filled with a connecting substance for bonding.

In accordance with a further embodiment the second ceramic housing part comprises the same material as the first ceramic housing part. The second ceramic housing part, similarly to the first ceramic housing, is preferably an injection-molded part that can be produced by means of ceramic injection molding technology.

In accordance with a further embodiment the first and the second ceramic housing part are interconnected by a connecting substance. The connecting substance may comprise a polymer, glass or a ceramic adhesive or may be a polymer, glass or ceramic adhesive, for example depending on the working temperature of the temperature sensor system. The first and the second ceramic housing part are preferably interconnected in a force-fitting and form-fitting manner by means of the connecting substance via sealing faces.

In accordance with a further embodiment the temperature sensor system comprises a potting material, which is arranged in the lower part of the first ceramic housing part and encases the temperature probe in part, preferably with the exception of regions of the sensor element housing protruding from the lower part. The potting material, for example, may comprise a polymer, preferably a thermally stable polymer, a glass or a cement-like material, such as aluminum oxide cement, or may consist of one of these materials. Here, the selection of the potting material is dependent in particular on the working temperature of the temperature sensor system. By way of example, the potting material with a working temperature up to 300° C. may comprise a thermally stable polymer or may consist thereof. With working temperatures up to 1000° C., glass or a cement-like material is preferred in particular.

In accordance with a further embodiment the potting material and the connecting substance comprise the same material. By way of example, a thermally stable potting material with adhesive properties can be used as potting material. The material for the bonding of the first and second ceramic housing part can also be used simultaneously to fix the electrical feed lines and/or connection lines connected to the electrical feed lines and/or to fill a point of connection to the electrical feed lines and line guides.

Advantages of the temperature sensor system described here lie in particular in a very precise embodiment of the housing dimensions, which enables simple and standardized mounting without additional system elements. This is achieved with simultaneously very short response times, a very high mechanical and chemical robustness, and also extreme long-term stability.

Furthermore, a method for producing a temperature sensor system is specified. The temperature sensor system producible or produced thereby may have one or more features of the aforementioned embodiments. The embodiments described previously and hereinafter apply equally for the temperature sensor system and the method for producing the temperature sensor system.

In accordance with an embodiment the temperature probe element with a ceramic sensor element housing and also the first and the second ceramic housing part are provided.

The first and second ceramic housing part can be produced for example by means of a ceramic injection molding technology. Here, a ceramic feedstock, comprising a structural ceramic powder, advantageously mullite, steatite or stabilized zirconium oxide, and an organic binder is injected into an appropriate mold. The 'green bodies' produced therefrom are then largely freed from the organic component in a debindering process, which is performed in two steps, i.e. aqueously and thermally, or in one step, i.e. only thermally. The debindered bodies are then sintered at suitable temperature.

The ceramic sensor element housing of the temperature probe element is preferably produced likewise by means of the ceramic injection molding technology. Here, a ceramic feedstock, comprising a structural ceramic powder, such as aluminum oxide powder, aluminum nitride powder or silicon carbide powder, and an organic binder is injected into an appropriate mold. These 'green bodies' are then largely freed from the organic component in a debindering process, which again can be performed in two steps or in one step. The debindered bodies are then sintered at a suitable temperature, for example in the case of aluminum oxide at approximately 1600° C. to 1700° C., depending on purity.

In accordance with a further embodiment a provided sensor element is arranged in the sensor element thus produced, in such a manner that at least one side face of the sensor element is in direct form-fitting contact with the sensor element housing. Furthermore, contact elements that form the electrical feed lines of the temperature probe element are each electrically conductively connected to the electrodes of the sensor element once the sensor element has been arranged in the sensor element housing. By way of example, the metallization pastes can be metered into the side pockets of the indentation, and the contact elements can then be introduced into the side pockets, such that ends of the contact elements are embedded in the metallization paste. The metallization paste is preferably then annealed at a suitable temperature, which is dependent on the used material of the metallization paste.

In accordance with a further embodiment the opening of the sensor element housing is sealed by means of a glass paste. The glass paste is then annealed at a suitable temperature. The glass material used for the glass paste is preferably matched to the future working temperature of the temperature sensor and has a softening point TG of at least 50° C. above the maximum working temperature of the temperature sensor.

In accordance with a further embodiment the resistance of the elements is adjusted within a limited scope by means of a subsequent tempering process in order to set a low resistance tolerance.

The temperature probe element thus produced is then arranged in the sleeve-shaped lower part of the first ceramic housing part in such a manner that the sensor element housing is arranged at least in part in the first opening. Here, part of the sensor element housing preferably protrudes from the sleeve-shaped lower part of the first ceramic housing part. Potting material is then introduced into the first ceramic housing part in such a manner that the temperature probe element is embedded at least in part in the potting material. Part of the electrical feed lines is then arranged within the recesses of the upper part of the first ceramic housing part. The upper part of the first ceramic housing part is then connected to the second ceramic housing part by means of a connecting substance.

In accordance with a further embodiment potting material is introduced into the first ceramic housing part in such a manner that the sensor element housing is encased in part by the potting material. In particular, the part of the sensor element housing arranged in the sleeve-shaped lower part is preferably encased by the potting material. Furthermore, part of the electrical feed line is arranged in the recesses of the upper part of the first ceramic housing part. The upper part of the first ceramic housing part is then connected to the second ceramic housing part by means of a connecting substance, which for example comprises a polymer, a glass or a ceramic adhesive. In accordance with a preferred embodiment the potting material and the connecting substance comprise the same material.

In accordance with a further embodiment the electrical feed lines of the temperature probe element are connected to the connection lines by means of hard soldering, crimping or welding. Furthermore, sub-regions of the electrical feed lines and/or the connection lines are preferably arranged partly in the recesses of the upper part of the first ceramic housing part prior to the connection of the upper part to the second ceramic housing part.

In accordance with a further embodiment the connection lines are then sealed by means of a polymer or by means of glass in an exit region from the first and/or second ceramic housing part.

BRIEF DESCRIPTION OF THE DRAWINGS

Further advantages and advantageous embodiments of the temperature sensor system will emerge from the embodiments described hereinafter in conjunction with FIGS. 1 to 12.

In the figures.

DETAILED DESCRIPTION OF ILLUSTRATIVE EMBODIMENTS

Identical or identically acting components may be provided with the same reference signs in the exemplary embodiments and figures. In principle, the illustrated elements and dimensions thereof relative to one another are not to be considered as to scale. Rather, individual elements, such as layers, components and regions, can be illustrated in bold or in an enlarged manner for improved presentability and/or for improved understanding.

Figure 1:
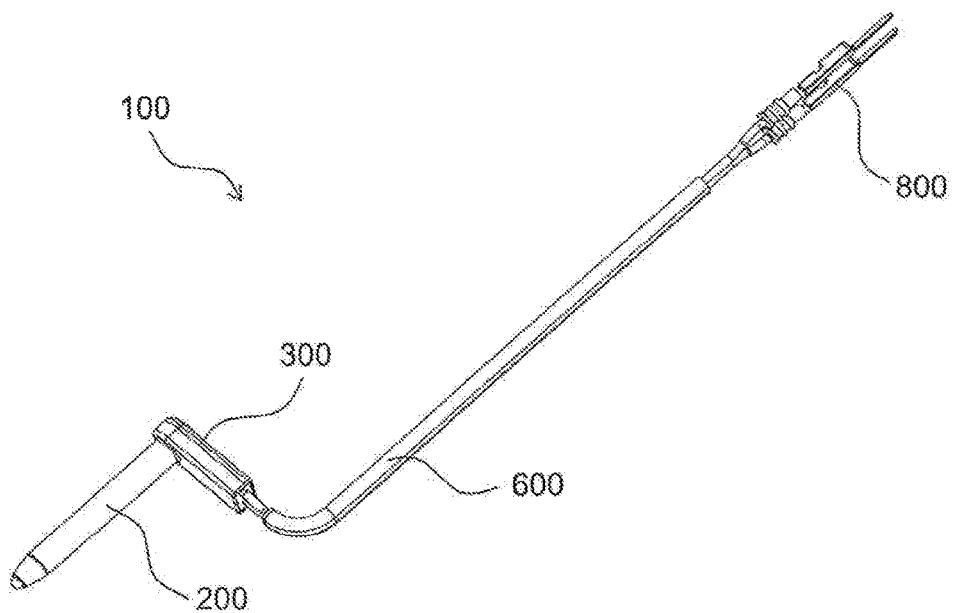
FIGS. 1 to 4 show schematic illustrations of a temperature sensor system in accordance with exemplary embodiments.
Figure 2:
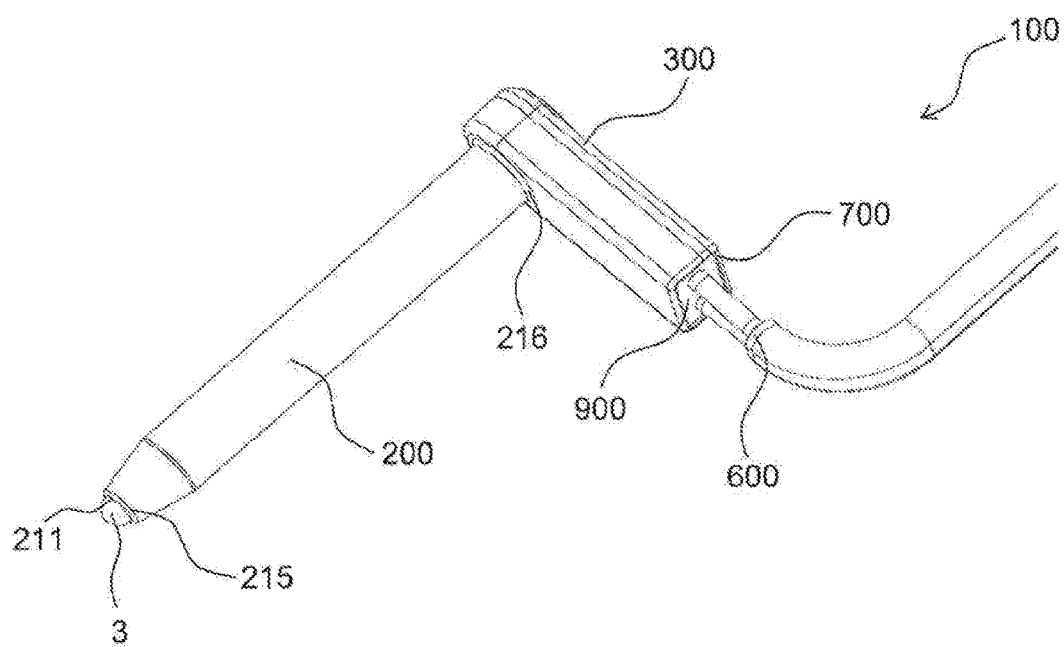
Figure 3:
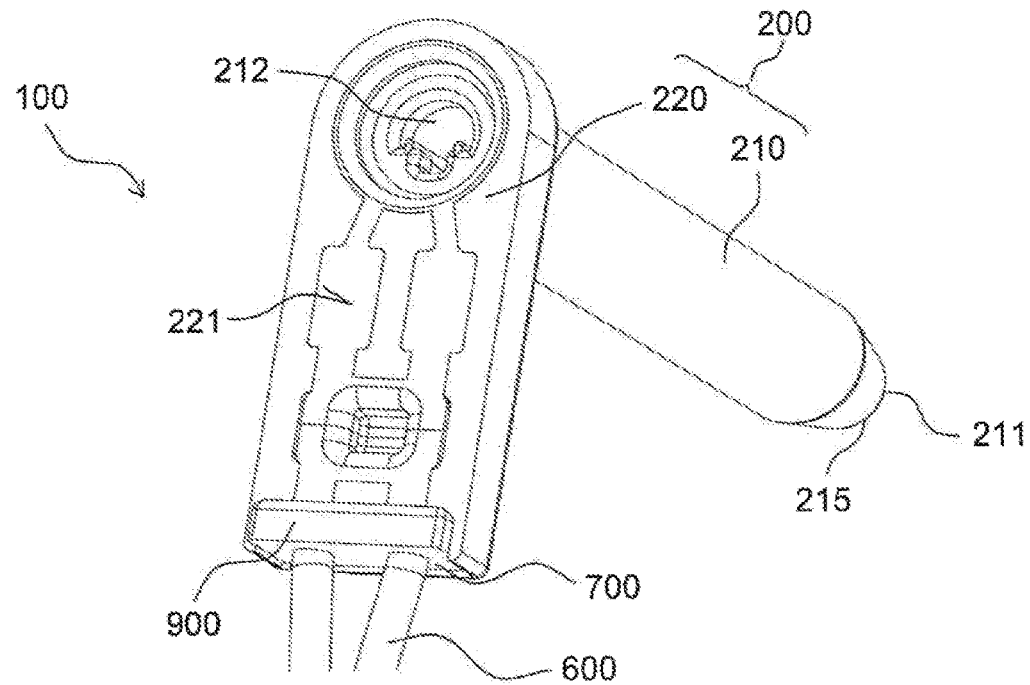
Figure 4:
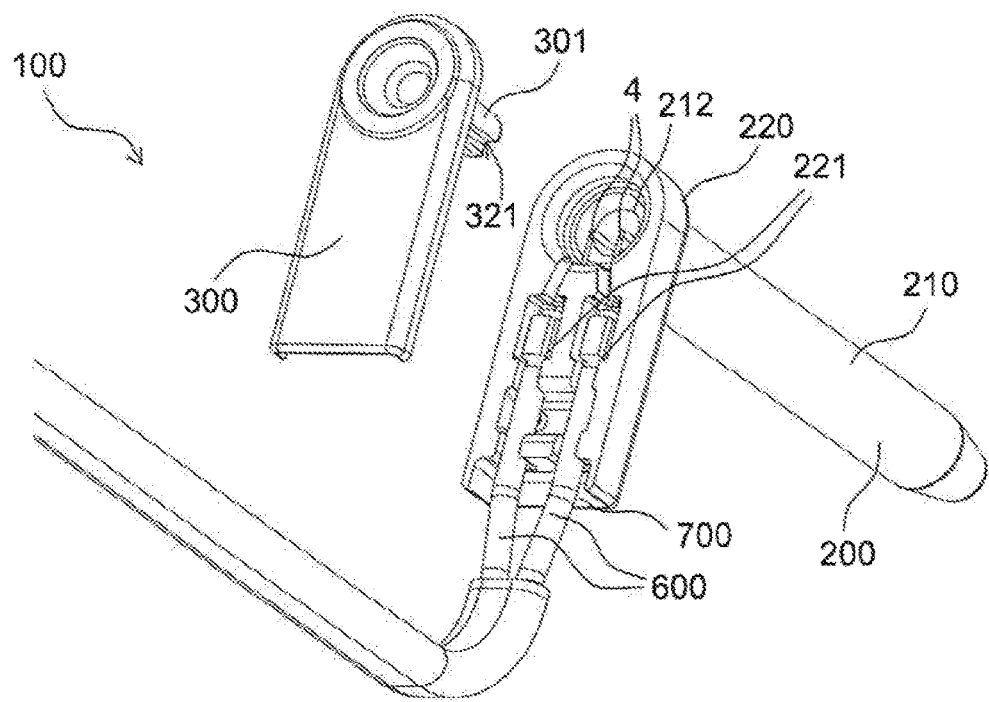
Figure 5:
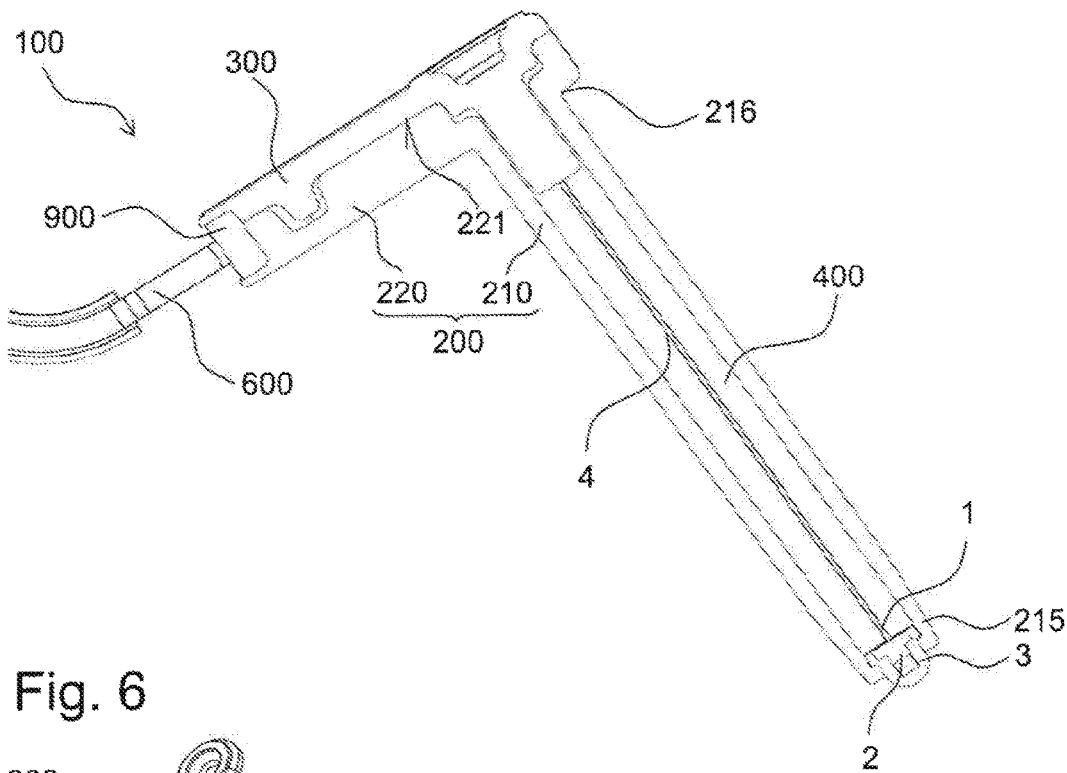
FIG. 5 shows a schematic sectional view of the temperature sensor system of FIGS. 1 to 4.
Figure 6:
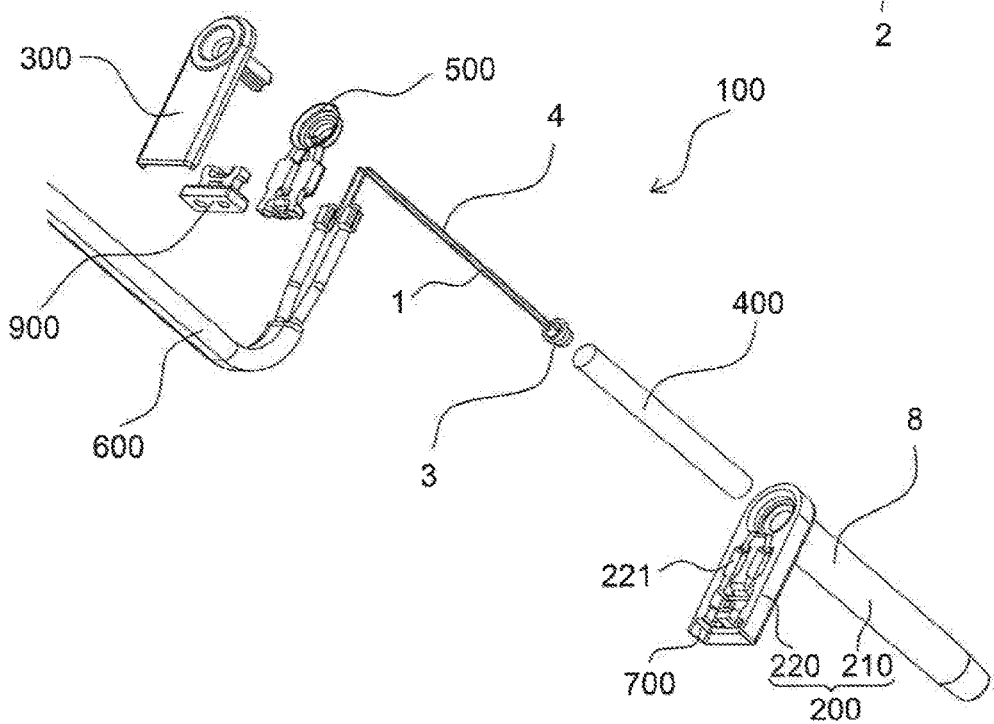
FIG. 6 shows a schematic illustration of the temperature sensor system of FIGS. 1 to 5 in the form of an exploded illustration.

FIGS. 1 to 4 show various views of a temperature sensor system 100 described here in accordance with an exemplary embodiment. Here, temperature sensor system 100 is illustrated in FIG. 3 without the second ceramic housing part 300. FIG. 5 shows temperature sensor system 100 from FIGS. 1 to 4 in a sectional view, and in FIG. 6 temperature sensor system 100 is shown in the form of an exploded illustration. The following description relates equally to FIGS. 1 to 6.

Temperature sensor system 100 comprises a first ceramic housing part 200. The first ceramic housing part 200 comprises a sleeve-shaped lower part 210 with a first lower end 215 having a first opening 211, and a second upper end 216 having a second opening 212, and an upper part 220 connected to the second upper end 216. The sleeve-shaped lower part 210 and the upper part 220 together form an "L-shaped" body, which is formed in one piece. The first ceramic housing part 200 is an injection-molded part, which is produced by means of a ceramic injection molding method. The first ceramic housing part 200 comprises mullite. Alternatively, the first ceramic housing part 200 may also comprise steatite or zirconium oxide, or may consist of one of the aforementioned materials.

A temperature probe element 1, which comprises a ceramic sensor element housing 3, a sensor element 2 arranged in the sensor element housing 3 and electrical feed lines 4, is arranged at least in part in the lower part 210 of the first ceramic housing part 200. The ceramic sensor element housing 3 has a higher thermal conductivity than the first ceramic housing part 200. The exact design of the temperature probe element 1 in accordance with an exemplary embodiment will be described further below in conjunction with FIGS. 7 to 11.

The sensor element housing 3 of the temperature probe element 1 is arranged at least in part in the first opening 211. Here, the sensor element housing 3 is arranged at the lower end 215 partly within the sleeve-shaped lower part 210 and protrudes in part from the first opening 211. The electrical feed lines 4 connected to the sensor element 2 run in the direction of the second upper end 216.

The upper part 220 of the first ceramic housing part 200 comprises recesses 221, in which the electrical feed lines 4 of the temperature probe element 1 are arranged and guided at least in part. The lower part 210 and the upper part 220 of the first ceramic housing part 200 are formed in one piece. The first ceramic housing part 200 is an injection-molded part that is produced by means of a ceramic injection molding method. The first ceramic housing part comprises mullite. Alternatively, the first ceramic housing part 200 may comprise steatite or zirconium oxide, or may consist of one of these materials.

The temperature sensor system 100 further comprises a second ceramic housing part 300, which is connected to the upper part 220 of the first ceramic housing part 200. The second ceramic housing part 300 comprises an extension 301, which comprises recesses 321, in which the electrical feed lines are arranged and guided at least in part. The second ceramic housing part 300 likewise comprises mullite and is also produced as an injection-molded part.

The first and the second ceramic housing part 200 and 300 are interconnected by means of a connecting substance 500. The connecting substance 500 comprises a polymer. Alternatively, the connecting substance 500 may comprise a glass or a ceramic adhesive, or may consist of one of the aforementioned materials.

A potting material 400 is arranged in the sleeve-shaped lower part 210 of the first ceramic housing part 200 and at least partly encases and fixes the temperature probe element 1. The potting material 400 comprises a polymer. Alternatively, the potting material 400 may comprise a glass or a cement-like material, such as aluminum oxide cement, or may consist of one of the aforementioned materials.

The electrical feed lines 4 are connected to thermally stable connection lines 600 by means of hard soldering. Alternatively, the electrical feed lines 4 can be connected to the connection lines 600 by means of crimping or welding. The connection lines 600 comprise a sheathing, which consists of a polymer. It is also possible for the sheathing of the connection lines 600 to consist of glass fibers or for the connection lines 600 to be embodied as metal-sheathed mineral-insulated lines. The connection lines 600 are connected to a plug-in connection 800 by means of crimping. Alternatively, the connection lines 600 and the plug-in connection 800 can be connected by means of soldering or welding.

The temperature sensor system 100 comprises an exit region 700, in which the connection lines 600 exit from the first and second ceramic housing part 200 and 300. The exit region 700 is closed by means of a seal 900, which comprises a polymer. Alternatively, the seal 900 may comprise a glass or a ceramic potting material, or may consist of one of the aforementioned materials.

The temperature probe element 1 arranged in the sleeve-shaped lower part 210 of the first ceramic housing part will be described hereinafter on the basis of FIGS. 7 to 11.

Figure 7:
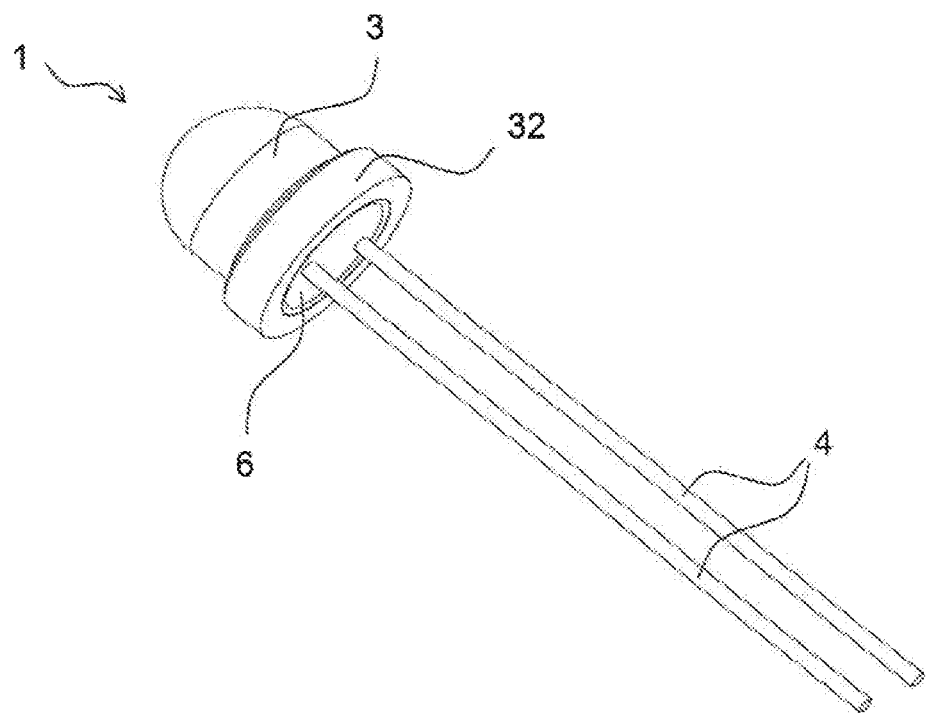
FIGS. 7 and 8 show schematic sectional views of a temperature probe element in accordance with an exemplary embodiment.
Figure 8:
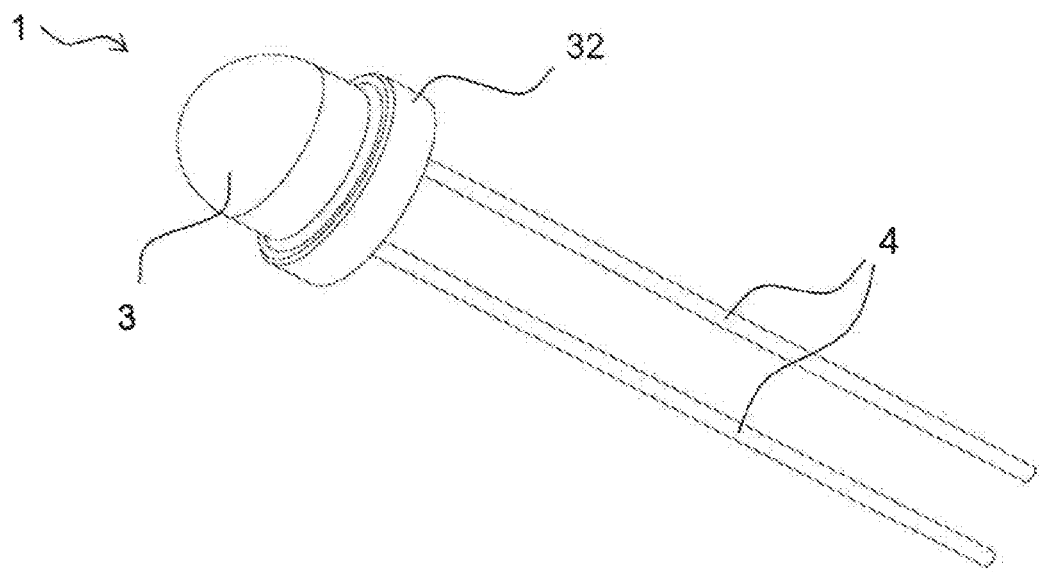
Figure 9:
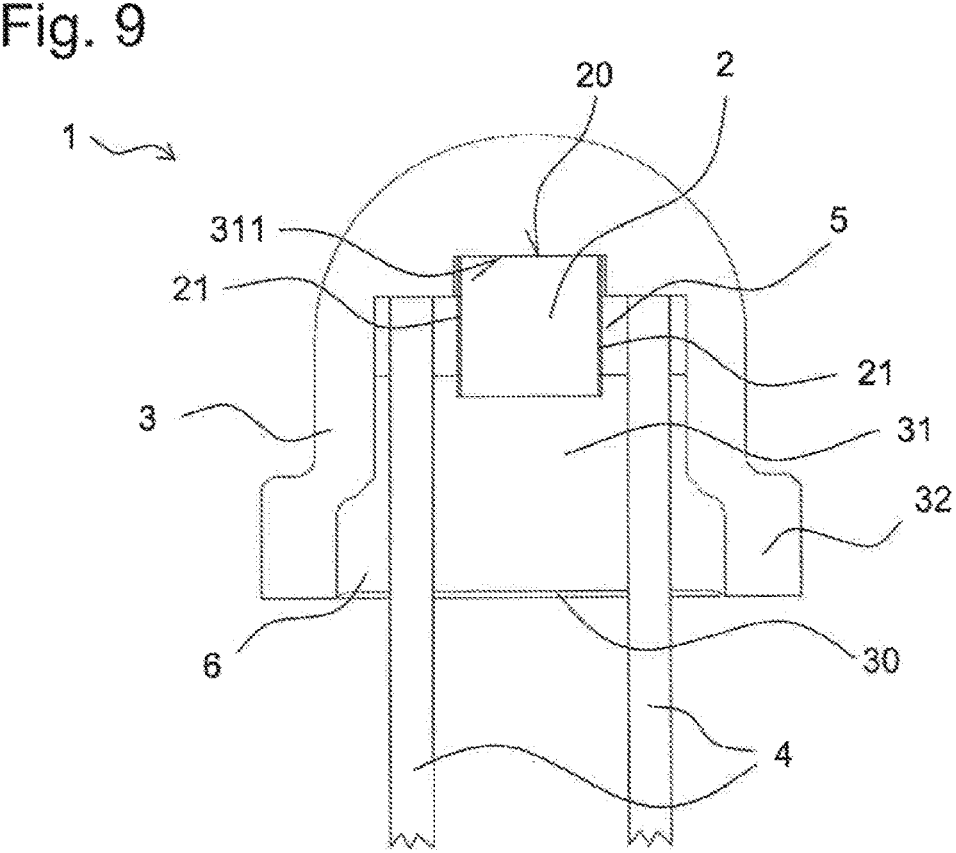
FIG. 9 shows a schematic sectional view of the temperature probe elements of FIGS. 7 and 8.
Figure 10:
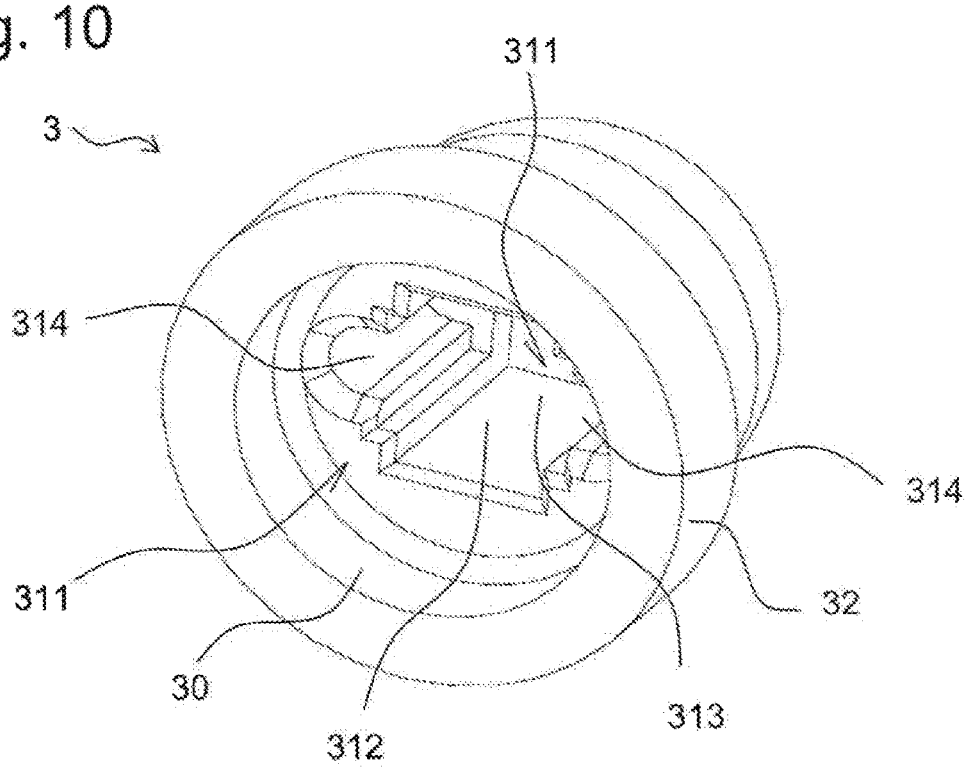
FIG. 10 shows a schematic view of a sensor element housing of the temperature probe elements of FIGS. 7 to 9.
Figure 11:
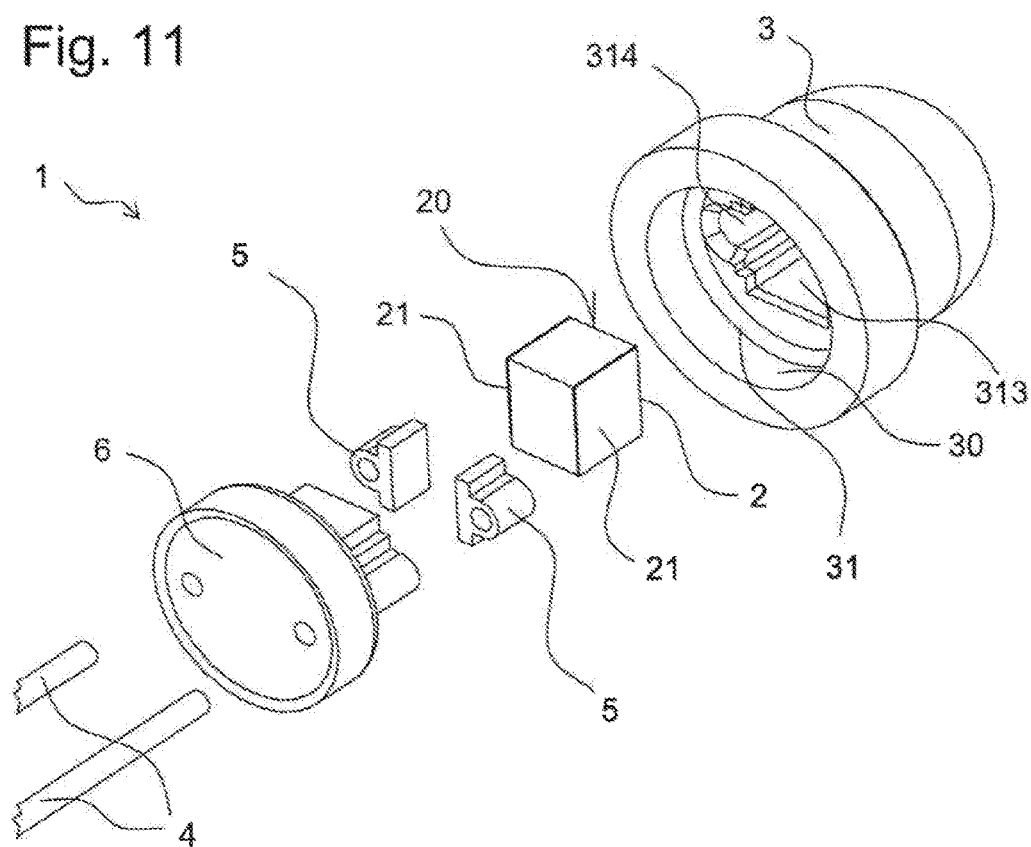
FIG. 11 shows a schematic illustration of the temperature probe elements of FIGS. 7 to 9 in the form of an exploded illustration.

FIGS. 7 and 8 show various schematic views of the temperature probe element 1 in accordance with exemplary embodiments. The elements of the temperature probe element 1 not illustrated in FIGS. 7 and 8 are shown in the sectional view of the temperature probe element 1 in FIG. 9, in the schematic illustration of the sensor element housing 3 in FIG. 10, and also in the exploded illustration of the temperature probe element 1 in FIG. 11. The following description relates equally to FIGS. 7 to 11.

The temperature probe element 1 comprises a sensor element 2, which is embodied as an NTC thermistor element, and a sensor element housing 3. The sensor element 2 is arranged in the sensor element housing 3 in such a manner that a side face 20 of the sensor element 2 is in direct and form-fitting contact with the sensor element housing 3, in particular with a base surface 311 of the sensor element housing 3. The sensor element housing 3 comprises aluminum oxide with a purity of more than or equal to 95% and is embodied as an injection-molded housing that is produced by means of what is known as ceramic micro injection molding technology. Alternatively, the sensor element housing 3 may comprise one or more other ceramic materials, which are preferably good thermal conductors. In particular, the sensor element housing 3 comprises a material that has a greater thermal conductivity than the material of the first ceramic housing part 200.

The sensor element in the shown exemplary embodiment comprises a ceramic with a perovskite structure. In particular, the ceramic of the sensor element has a composition according to the formula $(Y_{1-x}Ca_x)(Cr_{1-y}Al_y)O_3$ with $x=0.03$ to $0.05$ and $y=0.85$. The temperature probe element 1 is thus particularly suitable for high-temperature applications. Alternatively, the sensor element may comprise a ceramic with a spinel structure, in particular at lower application temperatures of the temperature probe element 1. By way of example, the ceramic of the sensor element may have a composition according to the formula $Co_{3-(x+y)}Ni_xMn_yO_4$ with $x=1.32$ and $y=1.32$.

The sensor element housing 3 comprises an opening 30, by which the sensor element housing 3 is open on one side. A cavity 31 is formed within the sensor element housing 3, said cavity comprising a base surface 311, opposite the opening 30, with a stepped indentation 312. The sensor element 2 is recessed at least in part in the indentation 312. In particular, the sensor element 2 is arranged in a primary region 313 of the indentation 312, which is adapted in terms of size and shape to a length and width of the sensor element 2. A side pocket 314 borders the primary region 313 of the indentation 312 on two opposite sides of the primary region 313. The side pockets 314, similarly to the primary region 313, are recessed regions within the cavity 31. Looking into the opening 30, the primary region 313 has, between the side pockets 314, a recessed region which borders the other regions of the cavity 31 in a stepped manner and of which the base surface 311 has a greater depth than the side pockets 314, as viewed from the opening 30.

The temperature probe element 1 comprises electrical feed lines 4, which are embodied as two contact elements and which are each arranged at least in part in a respective one of the side pockets 314. With their respective other end, the contact elements protrude from the sensor element housing 3 and are thus used for external contact of the temperature probe element 1. The contact elements comprise platinum. Alternatively, the contact elements may comprise or consist of gold, silver or other noble metals, or alloys, preferably steel alloys stable at high temperatures, for example with high contents of chromium and/or nickel.

The sensor element 2 has an electrode 21 on each of two opposite side faces. The electrodes 21 of the sensor element 2 comprise platinum. Alternatively, the electrodes 21 comprise or consist of gold or silver or silver/palladium. The contact elements are electrically connected to the electrodes 21 of the sensor element 2 by means of an annealed metallization paste 5, which is arranged in each of the side pockets 314. The metallization pastes 5 are used both to fix the contact elements within the side pockets 314 and for electrical contact between the contact elements and the electrodes 21 of the sensor element 2. In the shown exemplary embodiment the metallization pastes 5 comprise gold. Alternatively, the metallization pastes 5 may comprise or consist of silver, platinum, copper, molybdenum or tungsten or silver/palladium.

The sensor element housing 3 comprises, on the outer side, a rounded end opposite the opening. The sensor element housing 3 further comprises a protrusion 32 adjoining the opening 30. The protrusion 32 is embodied as a peripheral collar and can be connected in a form-fitting manner to the second opening 212 of the lower end 215 of the sleeve-shaped lower part 210 by means of an adhesive bond.

The sensor element housing 3 is also sealed on the rear side by means of a glass seal 6, through which the contact elements protrude. On account of its structure and the used materials, the temperature probe element 1 is characterized in particular by good long-term resistance to media, high robustness, and a very short response time.

The sensor element 2 of the temperature probe element 1 has dimensions of approximately 0.85 mm×0.7 mm×0.7 mm. The sensor element housing 3 of the temperature probe element 1 has maximum outer dimensions of approximately 2.5 mm×2.3 mm (diameter×height). Furthermore, the sensor element housing 3 has wall thicknesses between 0.1 mm and 1 mm. The length of the temperature probe element 1 inclusive of the contact element is approximately 10.8 mm.

The temperature sensor system 100 advantageously has very short response times, very high mechanical and chemical robustness, and good long-term stability. The temperature sensor system 100 can thus also be used at high application temperatures and in particularly aggressive media or gases. Further advantages of the temperature sensor system 100 lie in a very precise embodiment of the housing dimension, which enables simple and standardized mounting without additional system elements.

Figure 12:
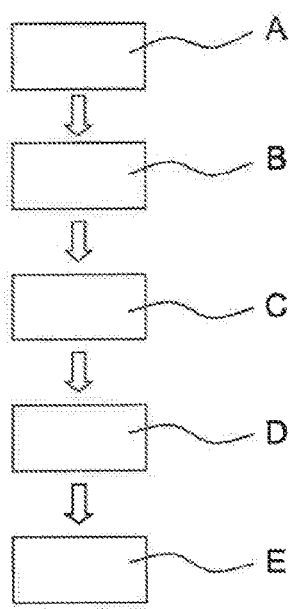
FIG. 12 shows a method for producing a temperature sensor system in accordance with a further exemplary embodiment.

FIG. 12 shows a method for producing a temperature sensor system 100 described here in accordance with an exemplary embodiment. Here, a temperature probe element 1 and also a first and a second ceramic housing part 200 and 300 are provided in a first method step A. The reference signs used hereinafter relate to the exemplary embodiments of FIGS. 1 to 11.

The first and second ceramic housing parts 200 and 300 are preferably produced by means of ceramic injection molding technology. Here, a ceramic feedstock, which comprises a structural ceramic powder formed from mullite and an organic binder, is injected into a desired mold, and the green bodies thus produced are then largely freed from organic components in a debindering process. The debindered bodies are then sintered at a suitable temperature.

During production of the temperature probe element 1, a ceramic starting material is formed by means of a ceramic injection molding method into a green body, and the green body is then sintered to form a sensor element housing 3. Here, the green body is preferably freed from organic components by means of a one-step or two-step debindering process, prior to the sintering. A provided sensor element 2 is then arranged in the sensor element housing 3. A metallization paste 5 is then introduced into side pockets 314 of the sensor element housing 3, and electrical feed lines 4 are then arranged in the side pockets 314, such that ends of the electrical feed lines 4 are embedded in the metallization pastes 5. The metallization paste 5 is then annealed. The sensor element housing 3 is then sealed on the rear side by means of a glass paste, and the glass paste is then annealed to form glass seal 6.

Once the first and second ceramic housing parts 200 and 300 thus produced and the temperature probe element 1 thus produced have been provided, the temperature probe element 1 is arranged in the sleeve-shaped lower part 210 of the first ceramic housing part 200 in a subsequent method step B, in such a manner that the sensor element housing 3 is arranged in part in the first opening 211 and protrudes in part from the sleeve-shaped lower part 210.

In method step C potting material 400 is then introduced into the first ceramic housing part 200, in particular into the sleeve-shaped lower part 210, in such a manner that the temperature probe element 1 is encased by the potting material 400, apart from the part of the sensor element housing 3 protruding from the first opening 211. The potting material 400 preferably comprises a polymer. Alternatively, the potting material 400 may comprise a glass or a cement-like material, such as aluminum oxide cement, or may consist of one of the aforementioned materials.

In the subsequent method step D part of the electrical feed lines 4 of the temperature probe element 1 is arranged in the recesses 221 of the upper part 220 of the first ceramic housing part 200.

The upper part 220 of the first ceramic housing part 200 is then connected in method step E to the second ceramic housing part 300 by means of a connecting substance 500, which for example comprises a polymer, a glass or a ceramic adhesive, wherein regions of the electrical feed lines 4 are guided in the recesses 321 of the extension 301 of the second ceramic housing part 300. The exit region 700 is then closed by means of a seal 900, which comprises a polymer. Alternatively, the seal 900 may also comprise a glass or a ceramic potting material, or may consist of one of the aforementioned materials.

The exemplary embodiments shown in the Figures alternatively or additionally may have further features according to the embodiments of the general description.

The invention is not limited to the description provided on the basis of the exemplary embodiments, but comprises any novel feature and also any combination of features. This includes in particular any combination of features in the claims, even if this feature or this combination itself is not explicitly specified in the claims or exemplary embodiments.

The invention claimed is:

1. A temperature sensor system, comprising:
   a first ceramic housing part comprising a sleeve-shaped first part with a first end having a first opening and a second end having a second opening, wherein the first ceramic housing part is adapted and arranged to protect the sensor system from outside media; and
   a temperature probe element arranged at least in part in the first part, the temperature probe element comprising a ceramic sensor element housing, a sensor element arranged in the sensor element housing, and electrical feed lines;
   wherein the sensor element housing is arranged at least in part in the first opening, and
   wherein the ceramic sensor element housing has a higher thermal conductivity than the first ceramic housing part.

2. The temperature sensor system according to claim 1, further comprising a second part, wherein the second part comprises recesses in which the electrical feed lines of the temperature probe element are arranged and guided at least in part, and wherein the first part and the second part are formed in one piece.

3. The temperature sensor system according to claim 1, wherein the first ceramic housing part is an injection-molded part.

4. The temperature sensor system according to claim 1, wherein the first ceramic housing part comprises mullite, steatite or zirconium oxide.

5. The temperature sensor system according to claim 1, wherein the ceramic sensor element housing comprises aluminum oxide, aluminum nitride or silicon carbide.

6. The temperature sensor system according to claim 1, comprising a second ceramic housing part, wherein the second ceramic housing part is connected to the second part of the first ceramic housing part, and wherein the second part comprises an extension with recesses in which the electrical feed lines are arranged and guided at least in part.

7. The temperature sensor system according to claim 1, wherein the temperature probe element is fixed in the first ceramic housing part by means of a potting material.

8. The temperature sensor system according to claim 1, wherein the sensor element is an NTC sensor element.

9. The temperature sensor system according to claim 1, wherein the sensor element has one of the following structures: a perovskite structure comprising elements Y, Ca, Cr, Al, and O, or a spinel structure comprising elements Ni, Co, Mn, and O.

10. The temperature sensor system according to claim 9, wherein the sensor element has a perovskite structure with a formula $(Y_{1-x}Ca_x)(Cr_{1-y}Al_y)O_3$, where x=0.03 to 0.05 and y=0.85.

11. The temperature sensor system according to claim 9, wherein the sensor element has a spinel structure with a formula $Co_{3-(x+y)}Ni_xMn_yO_4$, with x=1.32 and y=1.32.

12. A method for producing a temperature sensor system, comprising:
    providing a first ceramic housing part, wherein the first ceramic housing part comprises a sleeve-shaped first part with a first end having a first opening and a second end having a second opening;
    providing a temperature probe element, the temperature probe element comprising a ceramic sensor element housing, a sensor element arranged in the ceramic sensor element housing, and electrical feed lines, wherein the ceramic sensor element housing comprises a protrusion;
    arranging the temperature probe element at least in part in the sleeve-shaped first part of the first ceramic housing part in a manner that the protrusion cooperates with an inner surface of the first part at the first end of the first ceramic housing part, and the ceramic sensor element housing is arranged in part in the first opening and in part protrudes out of the first opening;
    introducing potting material into the first ceramic housing part in a manner that the temperature probe element is encased at least in part in the potting material;
    arranging part of the electrical feed lines within recesses of a second part of the first ceramic housing part; and
    connecting the second part of the first ceramic housing part to a second ceramic housing part using a connecting substance.

13. The method according to claim 12, wherein the potting material and the connecting substance comprise the same material.

14. The method according to claim 12, wherein the electrical feed lines are connected using hard soldering, crimping or welding to connection lines, wherein the connection lines are arranged partly in the recesses of the second part prior to the connection of the second part to the second ceramic housing part, and wherein the connection lines are sealed by a polymer or glass in an exit region from the first ceramic housing part, the second ceramic housing part, or both.

15. A method for producing a temperature sensor system, comprising:
    providing a first ceramic housing part comprising a sleeve-shaped first part with a first end having a first opening and a second end having a second opening, wherein the first ceramic housing part is adapted and arranged to protect the sensor system from outside media; and
    providing a temperature probe element arranged at least in part in the first part, the temperature probe element comprising a ceramic sensor element housing, a sensor element arranged in the ceramic sensor element housing, and electrical feed lines;
    wherein the ceramic sensor element housing is arranged at least in part in the first opening, and wherein the ceramic sensor element housing has a higher thermal conductivity than the first ceramic housing part.

16. The method according to claim 15, wherein the first part and the second part are formed in one piece.

17. The method according to claim 16, wherein the second part comprises recesses in which the electrical feed lines of the temperature probe element are arranged.

18. The method according to claim 17, wherein the sensor element is an NTC sensor element.

19. A temperature sensor system, comprising:
    a first ceramic housing part comprising a sleeve-shaped first part, the sleeve-shaped first part comprising a first end having a first opening and a second end having a second opening; and
    a temperature probe element arranged at least in part in the sleeve-shaped first part, the temperature probe element comprising a ceramic sensor element housing, a sensor element arranged in the sensor element housing, and electrical feed lines, wherein the ceramic sensor element housing comprises a protrusion;
    wherein the ceramic sensor element housing is arranged in part in the first ceramic housing part such that the protrusion cooperates with an inner surface of the first part at the first end of the first ceramic housing part, and wherein the ceramic sensor element housing in part protrudes out of the first opening.

20. The temperature sensor system according to claim 19, wherein the protrusion is connected to the first opening in a form-fitting manner by means of an adhesive bond.

* * * * *